(12) United States Patent
Gajendragadkar et al.

(10) Patent No.: US 10,121,150 B2
(45) Date of Patent: Nov. 6, 2018

(54) COMPLIANCE AS A SERVICE FOR AN ORGANIZATION

(71) Applicant: Tata Consultancy Services Limited, Mumbai, Maharashtra (IN)

(72) Inventors: Anjali Sagar Gajendragadkar, Maharashtra (IN); Rahul Ramesh Kelkar, Maharashtra (IN); Prasaad Patil, Maharashtra (IN); Sandeep M, Maharashtra (IN); Azad Kalakoti, Maharashtra (IN); Harrick Vin, Maharashtra (IN); Amit Setia, Maharashtra (IN)

(73) Assignee: TATA CONSULTANCY SERVICES LIMITED, Mumbai, Maharashtra ( * ) Notice: Subject to any disclaimer, the term of this patent is extended or adjusted under 35 U.S.C. 154(b) by 724 days.

(21) Appl. No.: 14/514,581

(22) Filed: Oct. 15, 2014

(65) Prior Publication Data
US 2015/0106279 A1    Apr. 16, 2015

(30) Foreign Application Priority Data
Oct. 15, 2013    (IN) .......................... 3245/MUM/2013

(51) Int. Cl.
*G06F 15/173*    (2006.01)
*G06Q 30/00*    (2012.01)

(52) U.S. Cl.
CPC .................................. *G06Q 30/018* (2013.01)

(58) Field of Classification Search
CPC ..... H04L 63/20; H04L 63/1433; H04L 41/28; H04L 41/50; H04L 47/70; H04L 47/78; H04L 63/10; G06Q 30/018
See application file for complete search history.

(56) References Cited

U.S. PATENT DOCUMENTS

| 7,885,943 B1* | 2/2011 | Yehuda .................. G06Q 10/10 707/665 |
| 8,769,412 B2 | 7/2014 | Gill et al. |
| 8,997,091 B1* | 3/2015 | Watson ..................... G06F 8/60 717/170 |
| 2007/0094638 A1 | 4/2007 | DeAngelis et al. |
| 2008/0059123 A1* | 3/2008 | Estberg .................. G06Q 10/06 705/1.1 |

(Continued)

OTHER PUBLICATIONS

Unknown. "Using Baseline Templates to Check Configuration Compliance"; Cisco, May 29, 2009, Chapter 7, 42 pages.

(Continued)

*Primary Examiner* — Liangche A Wang
*Assistant Examiner* — Ayele Woldemariam
(74) *Attorney, Agent, or Firm* — HM Law Group LLP; Vani Moodley, Esq.

(57) ABSTRACT

The present disclosure relates to system(s) and method(s) to provide compliance as a service for one or more organization. The system further facilitates identifying one or more causes involved to provide compliance as a service by analyzing compliance documents. The system and method also provides conversion of clauses into appropriate controls. The system and method also assists in defining control that can perform a specific task on a system. The system and method further provides mapping of compliance using control.

15 Claims, 7 Drawing Sheets

(56) References Cited

U.S. PATENT DOCUMENTS

| | | | | |
|---|---|---|---|---|
| 2010/0138457 A1* | 6/2010 | McDonald | ............ | G06F 17/2705 |
| | | | | 707/805 |
| 2010/0313978 A1* | 12/2010 | Yi | ............................ | F16K 1/305 |
| | | | | 137/625 |
| 2012/0102543 A1* | 4/2012 | Kohli | ...................... | H04L 63/20 |
| | | | | 726/1 |

OTHER PUBLICATIONS

Unknown. "Nessus Compliance Checks"; Tenable Support Portal, Sep. 5, 2014, https://support.tenable.com/support-center/nessus_compliance_checks.pdf.

Unknown. "VMware Compliance Checker for PCI"; VMware; Mar. 16, 2012.

* cited by examiner

Figure 1 (PRIOR-ART)

COMPLIANCE AS A SERVICE FOR AN ORGANIZATION

CROSS-REFERENCE TO RELATED APPLICATIONS AND PRIORITY

The present application claims priority to Indian Patent Application No. 3245/MUM/2013, filed on Oct. 15, 2013, the entirety of which is hereby incorporated by reference.

TECHNICAL FIELD

The present disclosure in general relates to a field of compliance services. More particularly, the present invention relates to a system and method to provide automated compliance audit services for Information Technology (IT) enabled organizations dealing in one or more IT related services.

BACKGROUND

With the automation and strategic involvement of Information Technology (IT) in day to day operations, demand for IT compliance has increased marginally. While delivering services to clients, an organization is bound to meet several technical and legal obligations associated with the IT compliance. There are several compliance rules and regulations that need to be met by an organization. These rules and regulations may be imposed by government bodies and may also include requirements with respect to a customer's need and demand. These compliance rules and regulation are not only important and necessary, but they also affect overall operations of the organization. In order to comply with these compliance rules and regulations, organizations set their own internal policies in line with the rules and regulations set by the government.

Organizations have to enforce these compliances rules and regulations with stringent processes and at appropriate frequency generate compliance reports and evidences to justify its compliant business process and operations.

Also, the IT components that are people dependent are also under the compliance umbrella. Further, all the IT enabled sectors and organizations are bound to meet the standard compliance at each stages of a service life cycle such as Design, Build, Migrate, Operate, Improve, and Govern. Further, in order to meet the applicable standards, IT organizations need to individually analyze each and every compliance requirement. These requirements may vary from organization to organization based on the elements and profiles of the organization. As a result each compliance rule needs to be individually analysed and accordingly modelled to check the compliance of the IT organizations. The architecture of existing compliance auditors 102 is disclosed in FIG. 1. The organizations may provide different services to different IT organizations for instance organization A, organization B, organization C and organization D. As represented in FIG. 1, the compliance auditor 102 is bound to provide customized services X, Y, and Z to organization A, B, and C respectively since the each of these organizations is linked with a different set of IT systems. Further, the services may vary with the variation in a business vertical 104 and business process implementation 106.

Hence, several challenges are faced by the current solutions due to diverse compliance requirements, frequent updates and complex interpretations. Also, there is lack of systematic approach to check correctness and completeness of compliance checking process.

SUMMARY

This summary is provided to introduce aspects related to systems and methods for determining compliance of an information technology organization and the aspects are further described below in the detailed description. This summary is not intended to identify essential features of the claimed subject matter nor is it intended for use in determining or limiting the scope of the claimed subject matter.

In one embodiment, a method to determine a compliance of a target system with respect to a set of rules and regulations stored in a compliance document is disclosed. Initially, the compliance document is parsed to determine a set of clauses present in the compliance document. In the next step, attributes associated with each clause from the compliance document are identified. Based on these attributes, a first set of controls is generated from the set of clauses. Each control is stored in the form of a standard template. Once the controls are generated, the target system is remotely analysed to identify a second set of controls from the first set of controls based on at least one element associated with the target system. In the next step, the second set of controls are calibrated based on a profiles associated with each element of the target system and a set of industrial standards applicable to the profile. In the next step, a configuration file of the target system is compared with the second set of controls so calibrated to determine the compliance of the target system with respect to the industrial standards associated with each clause.

In one embodiment, a system comprising a memory and a processor configured to determine a compliance of a target system with respect to a set of rules and regulations stored in a compliance document is disclosed. Initially, the compliance document is parsed to determine a set of clauses present in the compliance document. In the next step, attributes associated with each clause from the compliance document are identified. Based on these attributes, a first set of controls is generated from the set of clauses. Each control is stored in the form of a standard template. Once the controls are generated, the target system is remotely analysed to identify a second set of controls from the first set of controls based on at least one element associated with the target system. In the next step, the second set of controls are calibrated based on a profiles associated with each element of the target system and a set of industrial standards applicable to the profile. In the next step, a configuration file of the target system is compared with the second set of controls so calibrated to determine the compliance of the target system with respect to the industrial standards associated with each clause.

In one embodiment, a computer program product having embodied computer program to determine a compliance of a target system is disclosed. The computer program product comprising a program code for parsing a compliance document to determine a set of clauses present in the compliance document and a program code for identifying a plurality of attributes associated with each clause. The computer program product further comprises a program code for generating first set controls from the set of clauses based upon the plurality of attributes. Further, computer program product comprises a program code for remotely analysing the target system to identify a second set of controls applicable to the target system based on an element associated with the target system, wherein the second set of controls is a subset of the first set of controls. The computer program product further comprises a program code for calibrating the second set of controls based on a profile associated with the element and a set of industrial standards applicable to the profile. The computer program product further comprises a program code for comparing a configuration of the target system with the second set of controls so calibrated to determine the compliance of the target system.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present subject matter discloses an effective and efficient compliance auditing system and method for determining whether a target system is compliant with the applicable rules and regulation. The compliance auditing system also determines whether the target system is compliant to a set of internal policies associated with the target system. To determine the compliance of the target system, initially, the rules and regulations set by a government are identified in the form of clauses by analysing compliance documents that store the compliance rules and regulations in text format. The clauses define a set of attributes that need to be checked in the target system. The clauses in the compliance documents also define the industrial standards that need to be mapped against the attributes to determine whether the target system is compliant as per the set industrial standards.

In one example, the identified clauses are parsed by the compliance auditing system in order to extract the attributes present in each clause. In the next step the attributes are stored in a standard template referred as control. The control is user as a basic unit of checking the compliance of the target system. Further, the target system is analysed to determine elements present in the target system. In the next step, the controls that are applicable to the elements of the target system are identified.

Subsequently, the profile of each element in the target system is identified by the compliance auditing system. The profile information is used to calibrate the controls to suit the environment of the target system. These calibrated controls are then compared with the configuration of the target system to determine whether the target system is compliant with the rules and regulation of the target system. The controls may be reused for multiple target systems by fine-tuning the controls based on the profiles associated with different elements at different target systems.

While aspects of described system and method for determining compliance of a target system, the described system and method may be implemented in any number of different computing systems, environments, and/or configurations, the embodiments are described in the context of the following exemplary system.

Figure 1:
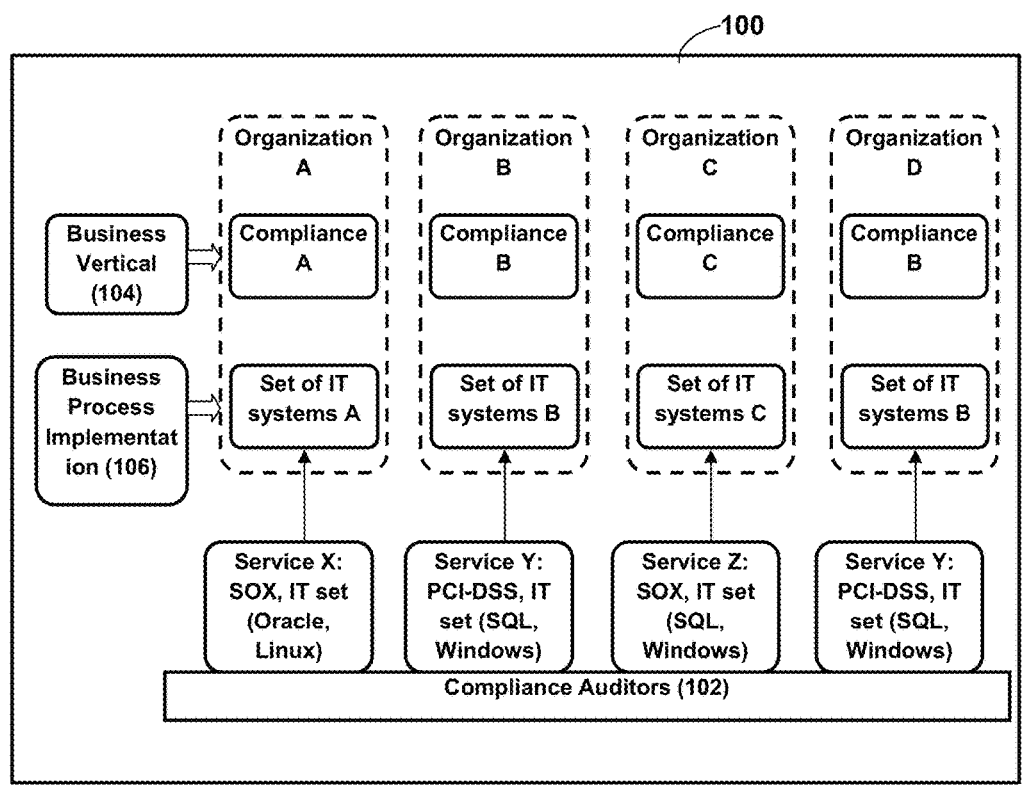
FIG. 1 illustrates systems available in the prior-art that are used by compliance auditors for compliance audit of different organizations.
Figure 2:
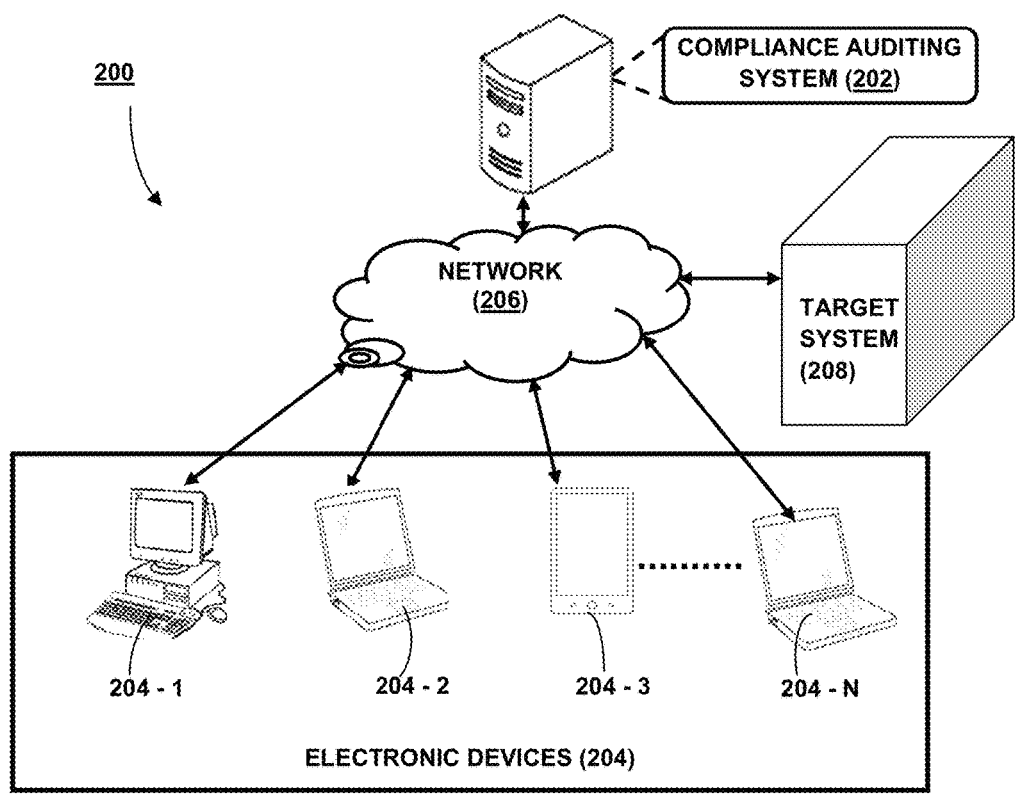
FIG. 2 illustrates a network implementation of a compliance auditing system for determining compliance level of a target system is shown, in accordance with an embodiment of the present subject matter.

Referring now to FIG. 2, a network implementation 200 of a Compliance auditing system 202 to determine compliance of the target system 208 to the set of rules and regulations is illustrated, in accordance with an embodiment of the present subject matter. In one embodiment, the Compliance auditing system 202 enables extracting clauses from compliance documents, wherein the clauses define the compliance rules and regulations. In one example, the identified clauses are parsed to extract attributes, these attributes are then stored in a control. The control is a standard template that stores attributes specified by the corresponding clause.

Further, the target system 208 is analysed to determine elements present in the target system 208. In the next step, the controls that are applicable to the elements of the target system 208 are also identified. Subsequently, the profile of each element in the target system 208 is identified. This profile information is used to calibrate the controls to suit the environment of the target system 208. The controls are then compared with the configuration of the target system 208 to determine whether the target system 208 is compliant with the rules and regulation applicable to the target system 208.

Although the present subject matter is explained considering that the Compliance auditing system 202 is implemented on a server, it may be understood that the Compliance auditing system 202 may also be implemented in a variety of computing systems, such as a laptop computer, a desktop computer, a notebook, a workstation, a mainframe computer, a server, a network server, and the like. In one implementation, the Compliance auditing system 202 may be implemented in a cloud-based environment. It will be understood that the Compliance auditing system 202 may be accessed by multiple users through one or more user devices 204-1, 204-2 . . . 204-N, collectively referred to as user devices 204 hereinafter, or applications residing on the user devices 204. Examples of the user devices 204 may include, but are not limited to, a portable computer, a personal digital assistant, a handheld device, and a workstation. The user devices 104 are communicatively coupled to the Compliance auditing system 202 through a network 206. Further the target system 208 may be connected to the compliance auditing system 202 through the network 206.

In one implementation, the network 206 may be a wireless network, a wired network or a combination thereof. The network 206 can be implemented as one of the different types of networks, such as intranet, local area network (LAN), wide area network (WAN), the internet, and the like. The network 206 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 3:
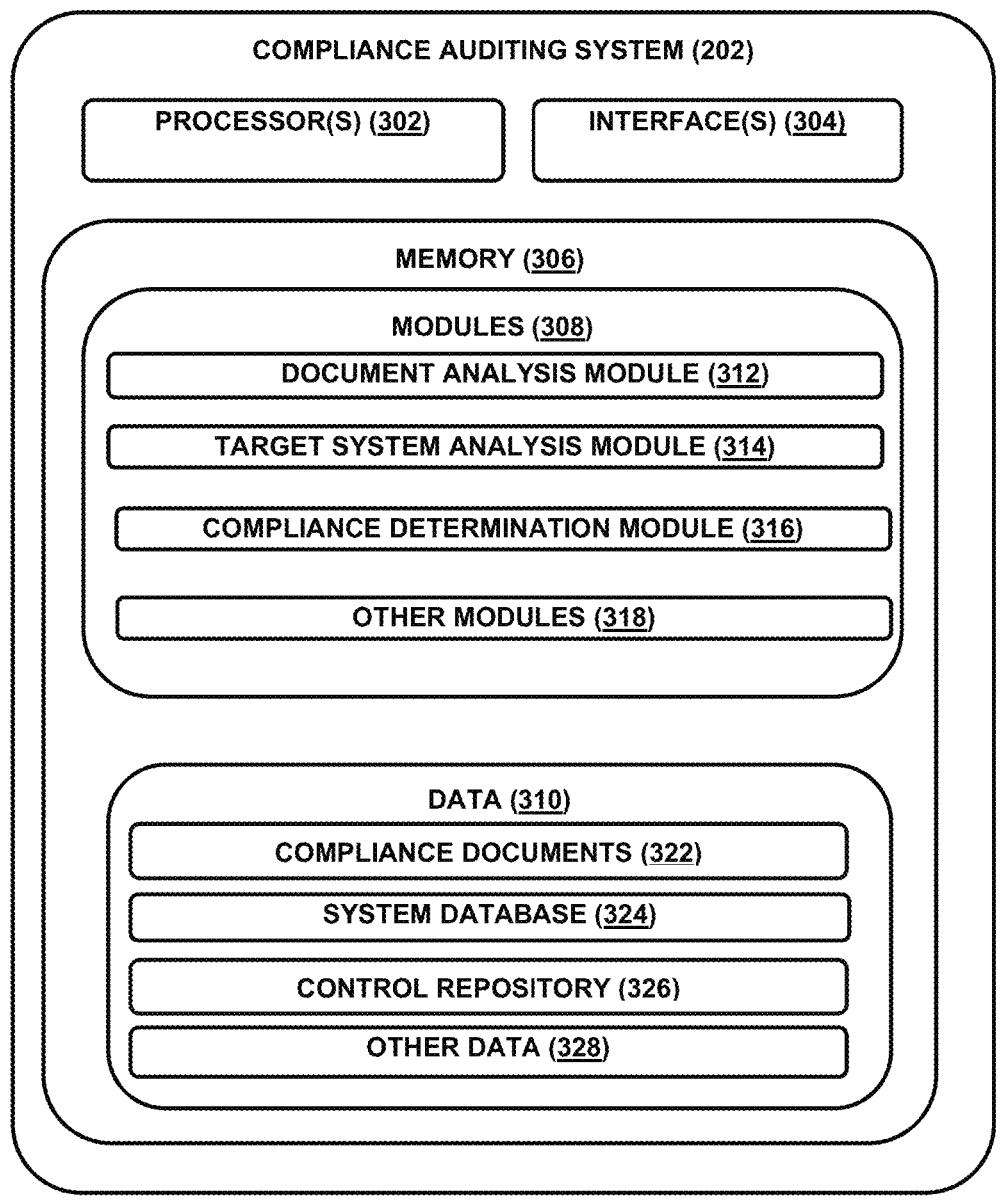
FIG. 3 illustrates the compliance auditing system, in accordance with an embodiment of the present subject matter.

Referring now to FIG. 3, the Compliance auditing system 202 is illustrated in accordance with an embodiment of the present subject matter. In one embodiment, the Compliance auditing system 202 may include at least one processor 302, an input/output (I/O) interface 304, and a memory 306. The at least one processor 302 may be implemented as one or more microprocessors, microcomputers, microcontrollers, digital signal processors, central processing units, state machines, logic circuitries, and/or any devices that manipulate signals based on operational instructions. Among other capabilities, the at least one processor 302 is configured to fetch and execute computer-readable instructions stored in the memory 306.

The I/O interface 304 may include a variety of software and hardware interfaces, for example, a web interface, a graphical user interface, and the like. The I/O interface 304 may allow the Compliance auditing system 202 to interact with a user directly or through the client devices 204. Further, the I/O interface 304 may enable the Compliance auditing system 202 to communicate with other computing devices, such as web servers and external data servers (not shown). The I/O interface 304 can facilitate multiple communications within a wide variety of networks and protocol types, including wired networks, for example, LAN, cable, etc., and wireless networks, such as WLAN, cellular, or satellite. The I/O interface 304 may include one or more ports for connecting a number of devices to one another or to another server.

The memory 306 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 306 may include modules 308 and data 310.

The modules 308 include routines, programs, objects, components, data structures, etc., which perform particular tasks, functions or implement particular abstract data types. In one implementation, the modules 308 may include a document analysis module 312, a target system analysis module 314, a control execution module 316, and other modules 318. The other modules 318 may include programs or coded instructions that supplement applications and functions of the compliance auditing system 202.

The data 310, amongst other things, serves as a repository for storing data processed, received, and generated by one or more of the modules 308. The data 310 may also include compliance documents 322, a system database 324, a control repository 326, and other data 328. The other data 328 may include data generated as a result of the execution of one or more modules in the other module 318.

In one implementation, at first, a user may use the client device 204 to access the Compliance auditing system 202 via the I/O interface 304. The users may register themselves using the I/O interface 304 in order to use the Compliance auditing system 202. The working of the Compliance auditing system 202 may be explained in detail in FIGS. 4 to 7 explained below. The Compliance auditing system 202 may be used for dynamically determining compliance level of the target system 208. In order to determine compliance level of the target system 208, the Compliance auditing system 202, at first, determines the rules and regulations applicable to the IT organization by analysing a plurality of compliance documents 322. The compliance document may summarize well known compliance rules and regulations such as the Sarbanes-Oxley Act (SOX), the Health Insurance Portability and Accountability Act (HIPAA), BASEL III, and Payment Card Industry Data Security Standard (PCI-DSS) set by the government. The compliance documents 322 may also include internal policies set by the target system 208 as well as a plurality of other IT organizations for which the target system 208 provides different service. In one of the present implementation, the compliance documents 322 are analysed by a document analysis module 312.

Figure 4:
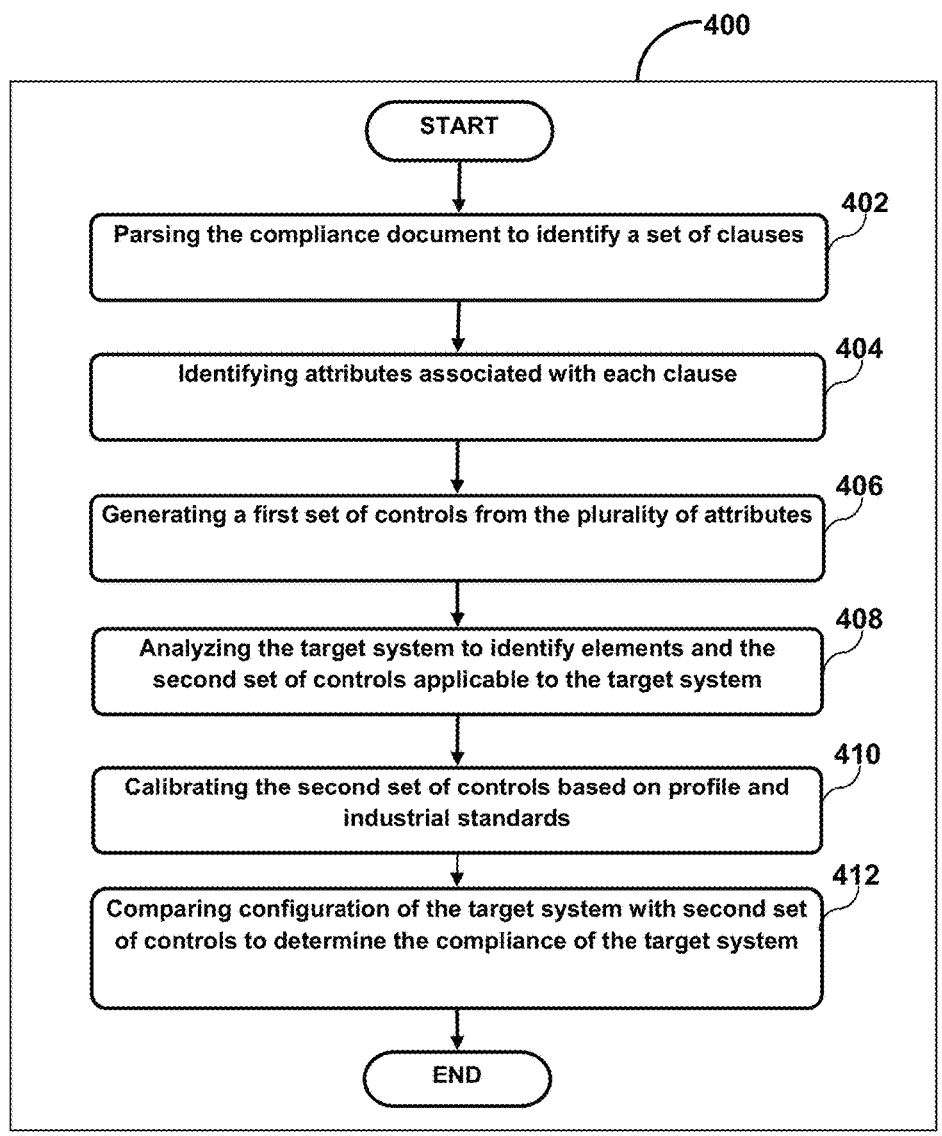
FIG. 4 illustrates a flowchart to enable the compliance auditing system to determine the compliance level of the target system, in accordance with an embodiment of the present subject matter.

Referring now to FIG. 4, a method 400 for determining compliance level of the target system 208 is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described compliance auditing system 202.

At block 402, the compliance document 322 may be parsed to determine clauses present in the compliance document 322. In one embodiment, the compliance documents 322 including PCI-DSS, HIPPA, and SOX as well as internal policies associate with the target system 208.

At block 404, a plurality of attributes associated with the clauses are identified, these attributes may include a compulsory pattern, a optional pattern, a citation, a control pre-requisite, a risk level, a control type and the profile applicability.

At block 406, first set controls are generated from the clauses based upon the plurality of attributes that are associated with the clauses 402. In one embodiment, the first set of controls may be stored in Excel or XML document format.

In one embodiment, the document analysis module 312 may perform the steps of blocks 402, 404 and 406. The working of the document analysis module 312 is further explained in FIG. 5.

At block 408, the target system 208 is remotely analysed to identify the elements associated with the target system 208. Based on the elements, a second set of controls are identified from the first set of controls. The second set of controls is a collection of controls that are applicable to elements associated with the target system 208

At block 410, the second set of controls is calibrated based on profiles associated with the element and a set of industrial standards applicable to the profiles associated with the elements.

In one embodiment, the target system analysis module 314 may be configured to perform the steps of blocks 408 and 410. The working of the target system analysis module 314 is further explained in FIG. 6.

At block 412, the configuration files of the target system 208 is compared with the second set of controls so calibrated to determine the compliance of each element of the target system 208. In one embodiment, the compliance determination module 316 may be configured to perform the steps of block 412. The working of the compliance determination module 316 is further explained in FIG. 7.

Document Analysis Module

Figure 5:
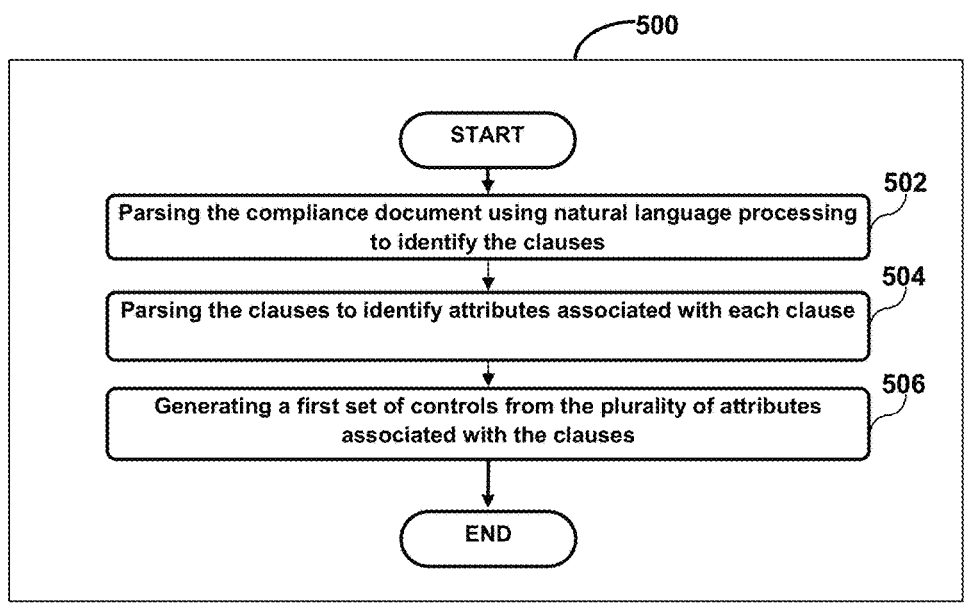
FIG. 5 illustrates a flowchart to enable the compliance auditing system for analysis of compliance documents to extract different rules and regulation in the form of clauses, in accordance with an embodiment of the present subject matter.

Referring to FIG. 5, a flowchart representing detailed working of the document analysis module 312 along with the working of other components of the compliance auditing system 202 for converting the clauses into first set of controls is illustrated, in accordance with an embodiment of the present subject matter.

At step 502, in one implementation, in order to extract clauses from the compliance documents 322, the document analysis module 312 may, at first, perform natural language processing on the compliance documents 322 and extract all the clauses present in the compliance documents 322. In one embodiment, the clauses may be classified as a simple clause, a complex clause, a citation specific clause, and a composite clause. A simple clause may define only a compulsory pattern to be checked to identify the compliance of the target system 208. Further, the complex clause may define the compulsory pattern as well as an optional pattern to identify the compliance of the target system 208. Further, the citation specific clause may define a specified pattern to be checked in specific citation for determining compliance of the target system 208. Further the composite clause may define pre-requisites to be checked in the citation in order to determine compliance of the target system 208.

At step 504, once the clauses are identified, a parsing technique is used by the document analysis module 312 to identify attributes and associated conditions present in each clause. The attributes define a set of conditions that need to be followed in order to comply with the rules and regulation present in the compliance documents 322. In one embodiment the attributes may include a compulsory pattern, an optional pattern, a citation, a control pre-requisite, a risk level, a control type, and the profile applicability.

At step 506, for each clause, a control is generated by the document analysis module 312. The control is a standard template storing all the attributes associated with the corresponding clause. All the controls associated with the clauses are then stored in the control repository 326 in the form of a first set of controls. The first set of controls represents all the clauses that are present in the compliance documents 322.

However, all the first set of controls may not be applicable to the target system 208 whose compliance level is to be determined. The target system analysis module 314 determines controls form the first set of controls, applicable to the target system 208. These applicable control are identified by the target system analysis module 314 based on the elements that are present in the target system 208.

Target System Analysis Module

Figure 6:
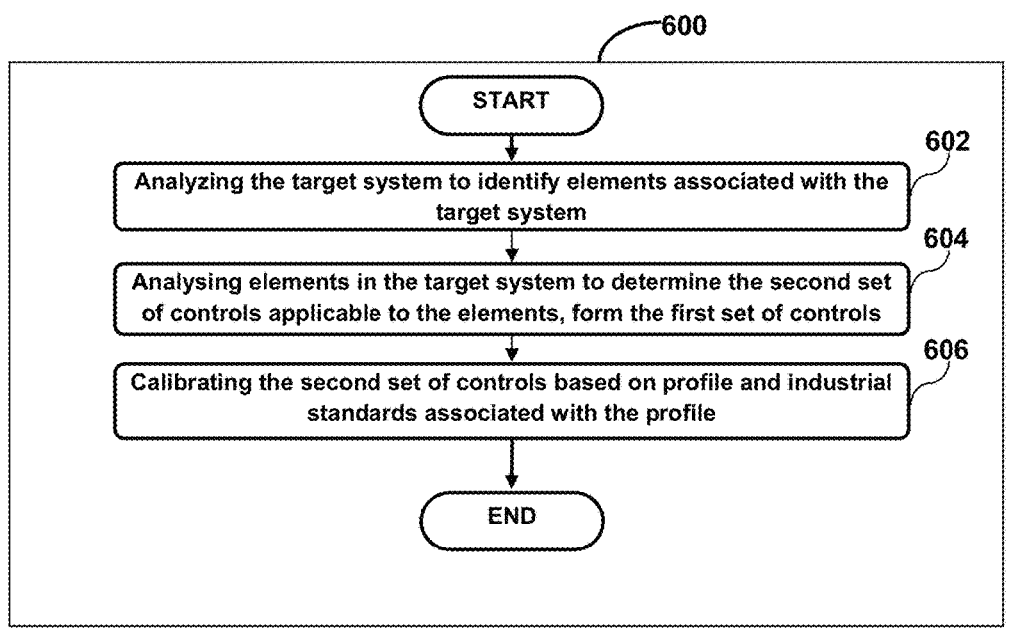
FIG. 6 illustrates a flowchart to enable the compliance auditing system for analysing the target system to identify applicable rules and regulations for compliance checking and calibrating the rules and regulations as per the profile of the target system, in accordance with an embodiment of the present subject matter.

FIG. 6 illustrates a flowchart representing detailed working of the target system analysis module 314 along with the working of other components of the compliance auditing system 202 for identifying controls from the first set of controls that are applicable to the target system 208 based on the elements associated with the target system 208. The controls that are applicable to the target system 208 are hereafter referred to as second set of controls.

At step 602, in order to identify the second set of controls, the target system analysis module 314 identifies the elements that are associated with the target system 208. The elements that are associated with the target system 208 may include a network layer, an applications layer, an operating system, a database, and middleware. Additionally the elements may also include a data centre, a cloud environment, applications, communication protocols, load balancers, virtual machines, a storage space, firewalls, a Network Attached Storage (NAS), a Storage Attached Networks (SAN), a server, and network devices. In one embodiment, based on the requirement of the compliance coverage to be provided, a single element associated with the target system 208 may be identified for compliance level checking.

At step 604, the target system analysis module 314 traverses through each control from the first set controls and determines whether the control is applicable to at least one element of the target system 208. All the controls that are identified as applicable to the elements of the target system 208 are stored in the control repository as second set of controls.

At step 606, profiles associated with elements are also identified from the target system analysis module 314. The profiles associated with the elements may include security, element management, monitor and logs, version and path management, as well as authentication and authorization. The identified profiles are used to calibrate the second set of controls, before testing the target system 208 for determining compliance level of the target system 208.

The process of checking the compliance level of the target system 208 using the second set of controls so calibrated is performed by the compliance determination module 316. The working of the compliance determination module is explained with respect to FIG. 7.

Compliance Determination Module

Figure 7:
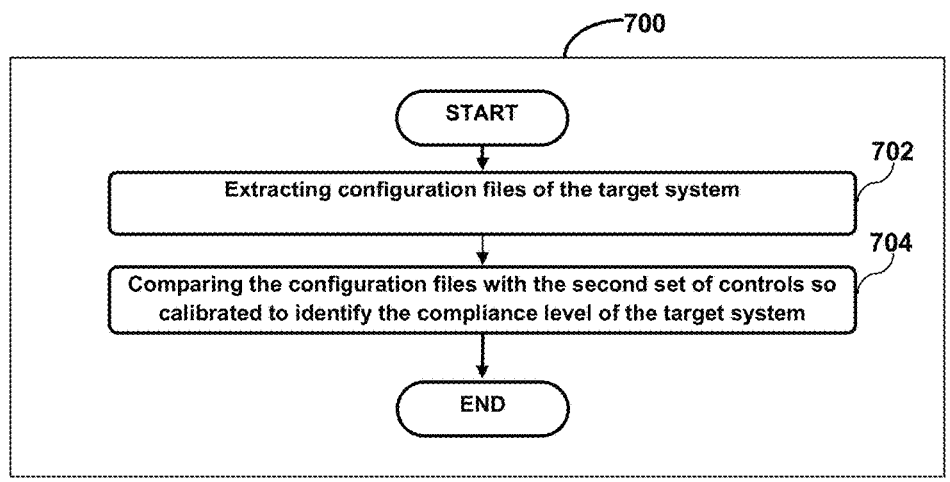
FIG. 7 illustrates a flowchart to enable the compliance auditing system for checking the compliance level of the target system using the rules and regulations so calibrated, in accordance with an embodiment of the present subject matter.

FIG. 7, illustrates a flowchart representing detailed working of the compliance determination module 316 along with the working of other components of the compliance auditing system 202 for checking the compliance level of the target system 208 using the second set of controls so calibrated.

At step 702, in one embodiment, the compliance determination module 316 extracts configuration files from the target system 208. The configurations files store critical information of all the elements present in the target system 208.

At step 704, the compliance determination module 316 compares the configuration files with the second set of controls so calibrated to identify whether the configuration of each element in the configuration file is as per the configuration specified by the corresponding control from the second set of controls. In one embodiment, a control from the second set of controls may be checked for a particular citation in the configuration file of the target system 208, the control may specify a citation start and a citation end in between which the control needs to be checked. The citation start and the citation end define a boundary for checking a compulsory pattern based upon the configuration of the target system 208.

In one embodiment, the results of the comparison are then processed by a compliance report generator. The compliance report generator generates detailed compliance reports summarizing the details of the elements that are compliant and non-compliant to the rules and regulations specified by the compliance documents 322.

Working Example

One of the clause in the compliance document states that "At the network layer the LAN manager authentication level must be set to:

1. Send NTLMv2 response only if the server is acting as operating system server

2. Send NTLMv2 response only and refuse LM & NTLM if the server is acting as a Domain Controller.

3. Other than send LM & NTLM responses use NTLMv2 session security if negotiated, if the server is acting as a web server."

The clause is converted into a control A

"1. [if (server profile==operating system server), (the LAN manager authentication level==Send NTLMv2 response only] or 2. [if (server profile==Domain Controller), (the LAN manager authentication level==Send NTLMv2 response only refuse LM & NTLM] or 3. [if (server profile==web server), (the LAN manager authentication level==Other than Send LM & NTLM responses use NTLMv2 session security]" by the compliance auditing system.

Initially the compliance auditing system identifies a server as the elements associated with the target system. In the next step, the profile of the server is identified as member server. Based on the profile of the server, the compliance auditing system calibrates the control A as "If (the LAN manager authentication level==Other than Send LM & NTLM responses use NTLMv2 session security) pass, else fail"

The Exemplary embodiments discussed above may provide certain advantages. Though not required to practice aspects of the disclosure, these advantages may include those provided by the following features.

Some embodiments enable a system and a method to provide a systematic approach to check correctness and completeness of compliance checking process for the target system.

Some embodiments enable the system and the method that can cover compliance rules and regulations applicable to different elements of the target system using a single standard template.

Some embodiments enable the system and the method for updating the compliance auditing system with new rules and regulations.

Some embodiments enable the system and the method for meeting diverse compliance requirements across different business verticals.

Although implementations for methods and systems to determine compliance level of a target system have been described in language specific to structural features and/or methods, it is to be understood that the appended claims are not necessarily limited to the specific features or methods described. Rather, the specific features and methods are disclosed as examples of implementations for determination of compliance level of the target system.

The invention claimed is:

1. A method to determine a compliance of a target system, the method comprising:
    parsing a compliance document to determine a set of clauses present in the compliance document, wherein the set of clauses are classified into:
        a simple clause, wherein only a compulsory pattern is checked to identify the compliance of the target system with respect to the simple clause;
        a complex clause, wherein the compulsory pattern and an optional pattern are checked to identify the compliance of the target system with respect to the complex clause;
        a citation specific clause, wherein a specified pattern is checked in specific citation to identify the compliance of the target system with respect to the citation specific clause; and
        a composite clause, wherein pre-requisites are checked in a citation to check the compliance of the target system with respect the composite clause;
    identifying a plurality of attributes associated with each clause, wherein the plurality of attributes comprises the compulsory pattern, the optional pattern, the citation, a control pre-requisite, a risk level, a control type and a profile applicability;
    generating first set controls from the set of clauses based upon the plurality of attributes;
    remotely analyzing the target system to identify a second set of controls applicable to the target system based on an element associated with the target system, wherein the second set of controls is a subset of the first set of controls;
    calibrating the second set of controls based on a) a profile associated with the element, wherein the profile associated with the element comprise information associated with security, element management, logs, version, path management, authentication and authorization and b) a set of industrial standards applicable to the profile;
    comparing a configuration of the target system with the second set of controls so calibrated to determine the compliance of the target system; and
    generating a compliance report of the target system based upon the comparison of the configuration of the target system with the second set of controls.

2. The method of claim 1, wherein the target system and the compliance document are associated with a domain of information technology.

3. The method of claim 1, wherein the control is modelled as a standard template, wherein the standard template stores at least one attribute captures from the clause.

4. The method of claim 1, wherein the set of industrial standards associated with the profile is identified from the compliance document.

5. The method of claim 1, wherein the element is at least one of a network layer, an operating system, a database, a middleware's, and an applications layer.

6. The method of claim 1, wherein the profile associated with the element is based on a role of the element performed in the target system.

7. The method of claim 1, wherein the citation is further classified as a citation start and a citation end, wherein the citation start and the citation end define a boundary for checking the compulsory pattern and the optional pattern based upon the configuration of the target system.

8. A system to determine a compliance of a target system, the system comprising:
- a memory and a processor coupled to the memory, wherein the processor is configured to perform the steps of:
- parsing a compliance document to determine a set of clauses present in the compliance document, wherein the set of clauses are classified into:
  - a simple clause, wherein only a compulsory pattern is checked to identify the compliance of the target system with respect to the simple clause;
  - a complex clause, wherein the compulsory pattern and an optional pattern are checked to identify the compliance of the target system with respect to the complex clause;
  - a citation specific clause, wherein a specified pattern is checked in specific citation to identify the compliance of the target system with respect to the citation specific clause; and
  - a composite clause, wherein pre-requisites are checked in a citation to check the compliance of the target system with respect the composite clause;
- identifying a plurality of attributes associated with each clause, wherein the plurality of attributes comprises the compulsory pattern, the optional pattern, the citation, a control pre-requisite, a risk level, a control type and a profile applicability;
  - generating first set controls from the set of clauses based upon the plurality of attributes;
  - remotely analyzing the target system to identify a second set of controls applicable to the target system based on an element associated with the target system, wherein the second set of controls is a subset of the first set of controls;
  - calibrating the second set of controls based on a) a profile associated with the element, wherein the profile associated with the element comprise information associated with security, element management, logs, version, path management, authentication and authorization and b) a set of industrial standards applicable to the profile;
  - comparing a configuration of the target system with the second set of controls so calibrated to determine the compliance of the target system; and
  - generating a compliance report of the target system based upon the comparison of the configuration of the target system with the second set of controls.

9. The system of claim 8, wherein the target system and the compliance document are associated with a domain of information technology.

10. The system of claim 8, wherein the control is modelled as a standard template, wherein the standard template stores at least one attribute captures from the clause.

11. The system of claim 8, wherein the set of industrial standards associated with the profile is identified from the compliance document.

12. The system of claim 8, wherein the element is at least one of a network layer, an operating system, databases, a middleware's, and an applications layer.

13. The system of claim 8, wherein the profile associated with the element is based on a role of the element performed in the target system.

14. The system of claim 8, wherein the citation is further classified as a citation start and a citation end, wherein the citation start and the citation end define a boundary for checking the compulsory pattern and the optional pattern based upon the configuration of the target system.

15. A non-transitory computer readable medium embodying a program product having embodied thereon a computer program to determine executable in a computing device for determining a compliance of a target system, the computer program product comprising:
- a program code for parsing a compliance document to determine a set of clauses present in the compliance document, wherein the set of clauses are classified into:
  - a simple clause, wherein only a compulsory pattern is checked to identify the compliance of the target system with respect to the simple clause;
  - a complex clause, wherein the compulsory pattern and an optional pattern are checked to identify the compliance of the target system with respect to the complex clause;
  - a citation specific clause, wherein a specified pattern is checked in specific citation to identify the compliance of the target system with respect to the citation specific clause; and
  - a composite clause, wherein pre-requisites are checked in a citation to check the compliance of the target system with respect the composite clause;
- a program code for identifying a plurality of attributes associated with each clause, wherein the plurality of attributes comprises the compulsory pattern, the optional pattern, the citation, a control pre-requisite, a risk level, a control type and a profile applicability;
- a program code for generating first set controls from the set of clauses based upon the plurality of attributes;
- a program code for remotely analyzing the target system to identify a second set of controls applicable to the target system based on an element associated with the target system, wherein the second set of controls is a subset of the first set of controls;
- a program code for calibrating the second set of controls based on a) a profile associated with the element, wherein the profile associated with the element comprise information associated with security, element management, logs, version, path management, authentication and authorization and b) a set of industrial standards applicable to the profile;
- a program code for comparing a configuration of the target system with the second set of controls so calibrated to determine the compliance of the target system; and
- a program code for generating a compliance report of the target system based upon the comparison of the configuration of the target system with the second set of controls.

* * * * *